United States Patent
Yu et al.

(10) Patent No.: US 7,613,258 B2
(45) Date of Patent: Nov. 3, 2009

(54) APPARATUS AND METHOD FOR DETERMINING GPS TRACKING LOOP PARAMETER BASED ON SNR ESTIMATION

(75) Inventors: Bo Yu, Chengdu (CN); Jianhui Hou, Chengdu (CN); ShiJie Li, Chengdu (CN); MingQiang Cheng, Chengdu (CN)

(73) Assignee: O2Micro International Ltd., Georgetown (KY)

( * ) Notice: Subject to any disclaimer, the term of this patent is extended or adjusted under 35 U.S.C. 154(b) by 593 days.

(21) Appl. No.: 11/364,768

(22) Filed: Feb. 28, 2006

(65) Prior Publication Data
US 2007/0201539 A1 Aug. 30, 2007

(51) Int. Cl.
H03D 1/04 (2006.01)

(52) U.S. Cl. .................. 375/346; 342/357.15; 342/453; 375/130; 375/136; 375/142; 375/147; 375/150; 701/213

(58) Field of Classification Search ............ 375/346
See application file for complete search history.

(56) References Cited

U.S. PATENT DOCUMENTS

| | | | |
|---|---|---|---|
| 6,574,283 B1* | 6/2003 | Sakoda et al. ............ 375/262 |
| 6,731,237 B2* | 5/2004 | Gustafson et al. ...... 342/357.06 |
| 7,395,155 B2* | 7/2008 | Hsu ......................... 701/213 |
| 2004/0141549 A1* | 7/2004 | Abraham et al. ........... 375/150 |
| 2005/0281358 A1* | 12/2005 | Bottomley et al. ......... 375/343 |
| 2007/0230329 A1* | 10/2007 | Hayashi et al. ............ 370/210 |

FOREIGN PATENT DOCUMENTS

WO WO/2005/109713 * 11/2005

OTHER PUBLICATIONS

David R. Pauluzzi and Norman C. Beaulieu, A Comparison of SNR Estimation Techniques for the AWGN Channel, (Journa)I, Oct. 2000, 11 pgs., Vol.48-No. 10, IEEE Transactions On Communications.

(Continued)

*Primary Examiner*—Shuwang Liu
*Assistant Examiner*—Dhaval Patel
(74) *Attorney, Agent, or Firm*—Wang Law Firm, Inc.; Li K. Wang

(57) ABSTRACT

A method for estimating signal quality of a spread spectrum signal is provided. The method includes squaring a plurality of in-phase correlation results and a plurality of quadrature correlation results, summing each squared in-phase correlation result and the corresponding correlation result to obtain a plurality of sum-of-square values, detecting a peak value among the plurality of sum-of-square results, calculating an average of non-peak values among the plurality of sum-of-square results. The peak value is regarded as a signal power value, while the averaged non-peak values are regarded as an average noise power value. A signal-to-noise ratio is then calculated based on the signal power value and the average noise power value. A method for determining the parameters for the tracking loop is also provided. The method includes estimating the signal-to-noise ratio of the spread spectrum signal, and determining the tracking loop parameters based on the signal-to-noise ratio.

7 Claims, 2 Drawing Sheets

OTHER PUBLICATIONS

Byungjin Chun, Seung Hee Choi & Beomsup Kim, A Digital Phase-Locked Loop With Variable Loop Gains Derived from RLS Method, (Article), 1997, 5 pgs.

Yeon-Sil Yang, Sang-Ho Lee, Sang-Sik Yoon and Hyung-Rae Park, Design and Performance Analysis of a Noncoherent Code Tracking Loop with Variable Loop Bandwidth, (Symposium), 2003, 5 pgs.

Byungjin Chun, Yong Hoon Lee & Boemsup Kim, Design of Variable Loop Gains of Dual-Loop DPLL, (Article), Dec. 1997, 3 pgs., vol. 45-No. 12.

Helmuth Brugel & Peter F. Driessen, Variable Bandwidth DPLL Bit Synchronizer with Rapid Acquisition Implemented as a Finite State Machine, (Article), Sep. 2004, 9 pgs., vol. 42-No. 9.

* cited by examiner

APPARATUS AND METHOD FOR DETERMINING GPS TRACKING LOOP PARAMETER BASED ON SNR ESTIMATION

FIELD OF THE INVENTION

The invention relates to baseband signal processing in spread spectrum communication, more particular, to the determination of tracking loop parameters based on signal quality estimation.

BACKGROUND OF THE INVENTION

Spread spectrum communication is advantageous in communication applications requiring high reliability in a noisy environment. In order to spread the spectrum, a high-speed pseudorandom noise (PRN) code is often used to modulate a narrow-band signal to generate a wide-band signal. To communicate data, the wide-band signal is modulated by a message data stream, referred to as navigation data. The message data rate is usually much lower than the PRN code rate.

A Global Positioning System (GPS) signal is a typical spread spectrum signal, broadcasted by the GPS satellites on L1, L2, and L5 carrier frequencies. Generally, in most current commercial GPS receivers, only L1 frequency (1575.42 MHz) is available. There are several signals broadcasted on the L1 carrier: coarse/acquisition code(C/A code), precision code (P code) and the navigation data. The detailed information of the satellite orbit is contained in the navigation data. The C/A code, which is a type of PRN code, is mainly used by civilian receivers for positioning purposes. A radio frequency signal coded by the C/A code becomes a spread spectrum signal. Each satellite has a unique C/A code and repeats the C/A code over and over again. The C/A code is a sequence of zeros and ones (binary). Each zero or one is known as a "chip". The C/A code is 1023 chips long, and it is broadcasted at 1.023 Mega-chips per second, i.e., the repetition of the C/A code lasts 1 millisecond. It is also possible to regard each chip as having two states: +1 and −1.

A GPS receiver is used to receive the GPS signals transmitted from the GPS satellites. In general, a GPS receiver includes two parts: RF (radio frequency) front end module and a base-band signal processing module. In RF front end module, the GPS signals may be received from an antenna. Through a RF tuner and a frequency synthesizer, the GPS signal (a radio frequency signal) is converted to a signal with a desired output frequency. Then, an analog-to-digital converter (ADC) digitizes the converted signal at a predetermined sampling frequency. The converted and digitized signal is known as intermediate frequency (IF) signal. The IF signal is then sent to the base-band signal processing module, which includes several signal processing stages, such as acquisition, tracking, navigation data extraction and position calculation.

The acquisition module is directed to detect the presence of the signal, more specifically, to conduct Doppler frequency shift search and C/A code phase shift search. Each GPS signal has a different C/A code with a different starting time and different Doppler frequency shift. Therefore, to find the signal of a certain satellite, GPS receivers traditionally conduct a two dimensional search, checking each C/A code with different starting time at every possible frequency. "Different starting time," as used herein, can be interpreted as the result of the phase delay of a C/A code. The acquisition method is thus employed to find the beginning of the C/A code and carrier frequency, in particular, the Doppler frequency shift of the signal. To test for the presence of a signal at a particular frequency and C/A code delay, the GPS receiver is tuned to the frequency, and integration is performed by correlating the incoming signal with a PRN code having a possible amount of phase delay over a time period. If the integration result exceeds a predefined threshold, the C/A code phase shift corresponding to this integration is then detected. If the integration result is below the predefined threshold, the search continues for the C/A code with a next possible delay. Traditionally, each possible delay of the C/A code is obtained by shifting the C/A code by half a chip. Since a C/A code comprises 1023 chips, 2046 delay possibilities may need to be checked for a fixed frequency. After all delay possibilities are checked, the search continues to a next possible frequency.

Once the beginning of the C/A code and the carrier frequency are found, these two parameters are passed to a tracking module. Due to the Doppler effect caused by the motion of satellite and the receiver, the carrier frequency and the C/A code may fluctuate around a center value over time although the C/A code and the carrier frequency has been found by the acquisition module. Therefore, the tracking module is provided to further finely adjust the carrier frequency and the C/A code phase by using two phase-locked loops (or tracking loops) to follow the GPS signal and thus obtaining the navigation data contained in the GPS signal. One tracking loop is used to track the carrier frequency in real time and is referred to as the carrier loop. The other one is used to track the C/A code in real time and is referred to as the code loop. The two loops must be coupled together.

One familiar type of the code loop is an early-late code loop. The early-late code loop includes a Doppler frequency shift removal module, an integration module, a phase detector, a loop filter and a code generator controlled by a code NCO (Numerically Controlled Oscillator). The code loop receives a finely synchronized carrier frequency output from the carrier loop. In the Doppler frequency shift removal module, the Doppler frequency shift can be removed by multiplying this synchronized carrier signal with the input IF signal. The code generator generates an early and a late C/A code. These two codes are the C/A code time shifted typically by approximately one-half-chip time of 0.489 us ($1/(2*1.023*10^6)$) or less. The early and late codes correlate with the input signal to produce two outputs. The phase detector is adapted to detect the phase error of the two outputs. The loop filter is provided to filter the phase error. A control signal is then generated based on the filtered phase error to adjust a locally generated C/A code generated by the code NCO to match the C/A code of the input signal. The locally generated C/A code is a prompt C/A code and this signal is used as an input to the carrier loop to strip the C/A code from the digitized input IF signal. The prompt C/A code is determined initially by the acquisition module as previously described.

The carrier loop includes a Doppler frequency shift removal module, an integration module, a phase detector, a loop filter and a carrier NCO (Numerically Controlled Oscillator). The carrier NCO generates a carrier frequency according to the value obtained from the acquisition module as previously described. This signal is divided into two paths: a direct one (in-phase channel) and one with a 90-degree phase shift (quadrature channel). In the Doppler frequency shift removal module, these two signals are multiplied with the input IF signal respectively and generate two outputs. The carrier loop further receives the prompt C/A code output from the code loop. In the integration module, the C/A code contained in the two outputs is stripped off by correlating the two outputs with the prompt C/A code respectively. The two phases of the outputs from the integration module are compared against each other through an arctangent comparator, which is a type of phase detector. The arctangent operation is insensitive to the phase transition caused by the navigation data and thus the carrier loop can be considered as a type of a Costas loop. The Costas loop is a phase-locked loop, which is insensitive to phase transition. The output of the comparator is filtered by the loop filter and generates a control signal. This control signal is used to tune the oscillator to generate a carrier frequency to follow the input signal.

There are two important parameters influencing the tracking operation: integration time and the bandwidth of the two loop filters. When the GPS signal is weak, which indicates an indoor movement of the receiver and an insignificant Doppler effect, the integration time may set to be longer to assure a correct peak detection among the integration results and the bandwidth of the tracking loop may set to be narrower because the frequency shift is not severe due to a slight Doppler effect. When the GPS signal is strong, which indicates an outdoor movement of the receiver and a considerable Doppler effect, the integration time should be reduced and the bandwidth may be widened to accommodate a relatively significant frequency shift rate.

In practice, a signal-to-noise ratio (SNR) is used to indicate the signal quality or signal strength. The signal-to-noise ratio is defined as the ratio of the amplitude of the desired signal to the amplitude of noise signals at a given point in time. The larger the number, the better the signal quality. The unit of SNR is usually expressed in dB.

Conventionally, these two parameters, integration time and the bandwidth of the two loop filters, are fixed in tracking module. However, the disadvantage of the unchangeable parameters becomes apparent when the signal strength of the received GPS signal changes. For instance, when the SNR is high, if the integration time and the bandwidth of the tracking loops are not well-chosen and remain constant, the tracking loop will lead to an unlock status and will not be able to follow the GPS signal in real time. When the SNR is low, the tracking loop will also not be able to follow the weak signal due to an unfavorable wide bandwidth of the tracking loop and a relatively short integration time period that might lead to a failure in peak value detection. Advantageously, the present invention is directed to providing methods to estimate the signal-to-noise ratio (SNR) of the received signal and adjust the parameters of tracking loop according to the estimated signal-to-noise ratio.

SUMMARY OF THE INVENTION

There is provided a method for estimating a signal-to-noise ratio of a spread spectrum signal with an in-phase component and a quadrature component. The method includes determining a plurality of in-phase correlation results based on the in-phase component and the plurality of pseudorandom noise codes, determining a plurality of quadrature correlation results based on the quadrature component and the plurality of pseudorandom noise codes, determining a plurality of sum-of-square values based on the plurality of the in-phase correlation results and the plurality of the quadrature correlation results. The pluralities of sum-of-square values have at least one peak value. The method further includes detecting a peak value among the plurality of sum-of-square results, and determining an average of non-peak values among the plurality of sum-of-square results. The peak value is a signal power value and the averaged non-peak value is the average noise power value. The signal-to-noise ratio is determined based on the signal power value and the average noise power value.

There is also provided a method for determining operation parameters used in a tracking process in a spread spectrum signal processing. The spread spectrum signal has an in-phase component and a quadrature component. The method includes determining a signal-to-noise ratio of a spread spectrum signal after an acquisition process of the spread spectrum signal processing based on correlation results of the spread spectrum signal, initializing the operation parameters used in the tracking process according to the signal-to-ratio. The step of determining a signal-to-noise ratio of a spread spectrum signal after the acquisition process further includes determining a plurality of in-phase correlation results based on the in-phase component and the plurality of pseudorandom noise codes, determining a plurality of quadrature correlation results based on the quadrature component and the plurality of pseudorandom noise codes, determining a plurality of sum-of-square values based on the plurality of the in-phase correlation results and the plurality of the quadrature correlation results. The pluralities of sum-of-square values have at least one peak value. The method further includes detecting a peak value among the plurality of sum-of-square results, and determining an average of non-peak values among the plurality of sum-of-square results. The peak value is a signal power value and the averaged non-peak value is the average noise power value. The signal-to-noise ratio is then determined based on the signal power value and the average noise power value.

There is yet provided a method for estimating a signal-to-noise ratio of a spread spectrum signal with an in-phase component and a quadrature component. The spread spectrum signal is digitized at a predetermined frequency. The method includes determining an in-phase correlation result based on the in-phase component and a predetermined pseudorandom code over a time period, determining a quadrature correlation result based on the quadrature component and a predetermined pseudorandom code over the time period, determining a signal power value based on the in-phase correlation result and the quadrature correlation result, determining an average noise power value based on the in-phase component and the quadrature component, and determining the signal-to-noise ratio based at least on the signal power value and the average noise power value.

There is yet provided a method for determining operation parameters used in a tracking process in spread spectrum signal processing. The spread spectrum signal is digitized at a predetermined frequency and the spread spectrum signal has an in-phase component and a quadrature component. The method includes determining in real-time a signal-to-noise ratio of the spread spectrum signal during the tracking process based on the spread spectrum signal and correlation results of the spread spectrum signal, and adjusting the operation parameters according to the signal-to-noise ratio. The step of determining in real-time a signal-to-noise ratio during the tracking process includes determining an in-phase correlation result based on the in-phase component and a predetermined pseudorandom code over a time period, determining a quadrature correlation result based on the quadrature component and a predetermined pseudorandom code over the time period, determining a signal power value based on the in-phase correlation result and the quadrature correlation result, determining an average noise power value based on the in-phase component and the quadrature component, and determining the signal-to-noise ratio based at least on the signal power value and the average noise power value.

There is provided an apparatus for estimating a signal-to-noise ratio of a spread spectrum signal with an in-phase component and a quadrature component. The apparatus includes an integration module, a sum-of-square module, a peak value detect module, an average noise power module, and a signal-to-noise ratio estimation. The integration module is adapted to determine a plurality of in-phase correlation results based on integration of the in-phase component and a plurality of pseudorandom noise codes, and is also adapted to the determine a plurality of quadrature correlation results based on integration of the quadrature component and the plurality of pseudorandom noise codes. The sum-of-square module is adapted to square the plurality of in-phase correlation results and the plurality of quadrature correlation results, sum the squared value of in-phase correlation results and the corresponding squared value of quadrature correlation results, and output a plurality of sum-of-square results. The peak value detect module is adapted to detect a peak value among the plurality of sum-of-square results from the sum-of-square means. The peak value is a signal power value. The average noise power module is adapted to average non-peak values among the plurality of the summing results. The averaged non-peak values is average noise power value. The signal-to-noise ratio estimation module is adapted to calculate the signal-to-noise ratio based on the signal power value and the average noise power value.

There is provided yet an apparatus for estimating signal-to-noise ratio of spread spectrum signal with an in-phase component and a quadrature component. The spread spectrum signal is digitized at a predetermined frequency. The apparatus includes an integration module, a sum-of-square module, an average noise power module, and a signal-to-noise ratio estimation module. The integration module is adapted to determine an in-phase correlation result based on the in-phase component and a predetermined pseudorandom code over a time period, and adapted to determine a quadrature correlation result based on the quadrature component and the predetermined pseudorandom code over the time period. The sum-of-square module is adapted to calculate a signal power value by summing squares of the in-phase correlation result and the quadrature correlation result. The average noise power module is adapted to calculate an average noise power value based on the in-phase component and the quadrature component. The signal-to-noise ratio estimation module is adapted to calculate the signal-to-noise ratio based at least on the signal power value and the average noise power value.

BRIEF DESCRIPTION OF THE DRAWINGS

Features and advantages of embodiments of the invention will become apparent as the following Detailed Description proceeds, and upon reference to the Drawings, where like numerals depict like elements, and in which.

DETAILED DESCRIPTION OF THE INVENTION

Usually, the parameters of the tracking module (bandwidth of the tracking loop and integration time) need to be initialized after the acquisition stage. These two parameters can be set accordingly by estimating the SNR of the received signal after acquisition is performed and before the tracking process started. Additionally, the parameters should be adjustable in real time during the tracking process based on the variation of the signal quality during the tracking process. Therefore, it is necessary to provide a real-time estimation of the SNR of the received signal during the tracking process to dynamically adjust the parameters. Consequently, there is provided two SNR estimation methods corresponding to the above two cases. One method is SNR estimation after the acquisition stage and before the tracking stage, where the parameters for the tracking loop can be initialized by using this method. The other method is another real-time SNR estimation during the tracking stage, where the parameters for the tracking loop can be adjusted in real-time by using this method.

The GPS signal can be broadcasted on L1 carrier frequency (1575.42 MHz) and L2 carrier frequency (1227.6 MHz). For clarity, the present invention concentrates on the L1 frequency and the pseudorandom noise code discussed herein is C/A code. It should be noted that the method the present invention disclosed may also be applicable to any type of carrier frequency and any type of PRN code.

Figure 1:
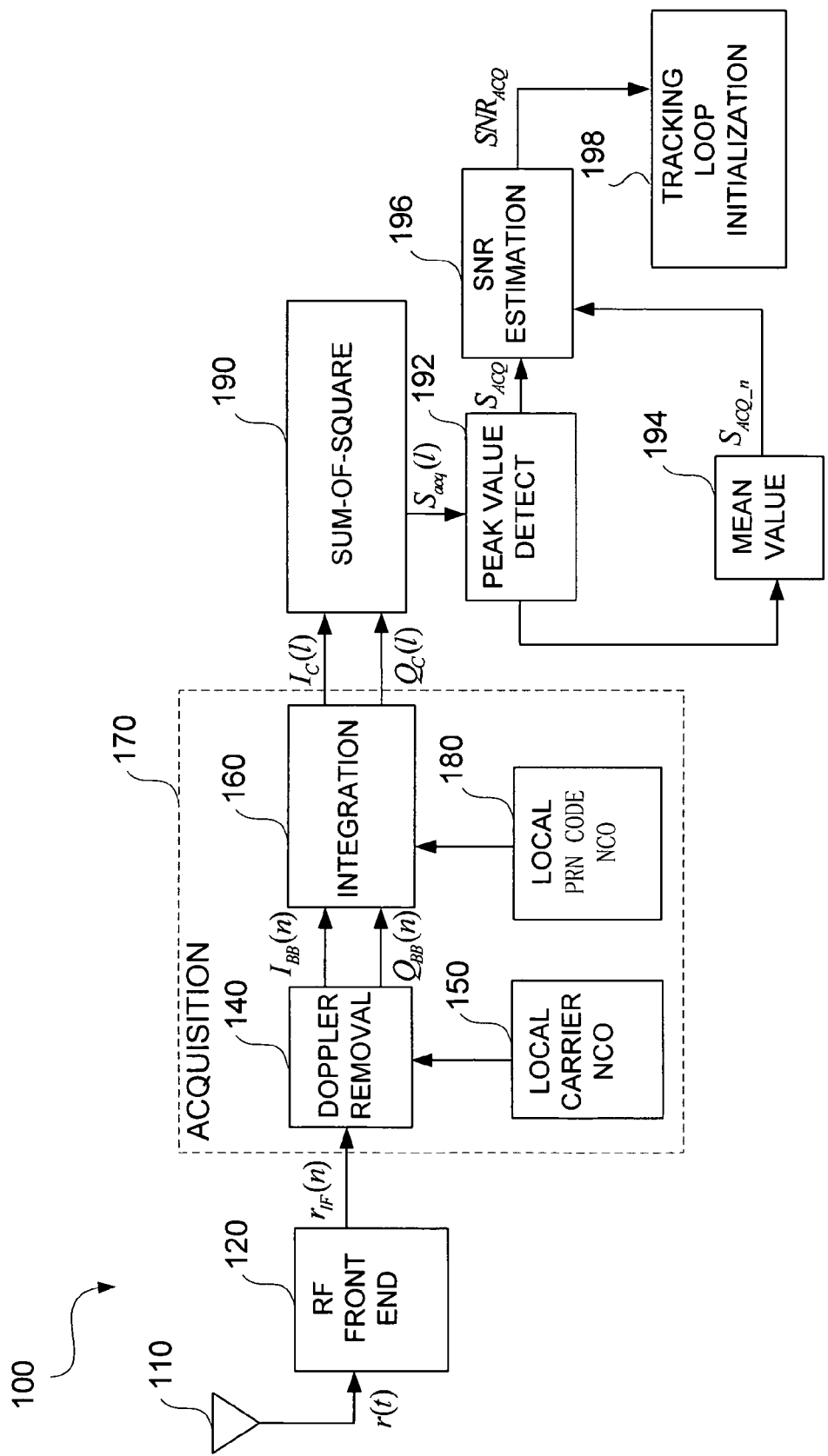
FIG. 1 illustrates a process for SNR estimation after acquisition stage and before the tracking stage.

FIG. 1 illustrates an exemplary SNR estimation method 100 after acquisition to initialize the parameters of the tracking loop. The GPS signals transmitted from the GPS satellites are received from an antenna 110. Let r(t) denote the received signal. r(t) can be expressed as:

$$r(t) = \sqrt{2P} c(t-\tau) d(t-\tau) \cos(\omega_c t + \omega_d t + \phi) + n(t) \quad (1)$$

where P refers to the power of the received signal, $\tau$ refers a time delay accumulated during the transition from the satellite to the receiver. c(t) refers to the C/A code modulating the navigation data, d(t) refers to the navigation data having a frequency of 50Hz, $\omega_c$ is the carrier angular frequency, wherein $\omega_c = 2\pi \times 1575.42$ M rad/s, n(t) is a white Gaussian noise with zero mean.

After the GPS signal is received by the antenna 110, it is processed by an RF front end processing module 120. In the RF front end 120, the received signal (also known as input signal) is converted from the GPS signal (a radio frequency signal) to a signal with a desired output frequency, such as an intermediate frequency $f_{IF}$. Then, an analog-to-digital converter (ADC) comprised in the RF front end 120 digitizes the converted signal at a predetermined sampling frequency $f_s$. The converted and digitized signal is known as digitized intermediate frequency (IF) signal $r_{IF}(n)$. Let C/A code frequency be $f_{CA}$, then, the total number of data points in one code chip is $f_s/f_{CA}$. The $r_{IF}(n)$ can be expressed as:

$$r_{IF}(n) = \sqrt{2P} c(n-\tau_{IF}) d(n-\tau_{IF}) \cos(\omega_{IF} n + \omega_d n + \phi) + n(n) \quad (2)$$

where n refers to a digitized form of time, $\tau_{IF}$ is the digitized time delay accumulated during the transition from the satellite to the receiver, $\omega_{IF}$ refers to the intermediate frequency, wherein $\omega_{IF} = 2\pi \times f_{IF}$ rad/s.

In the acquisition stage 170, a local carrier NCO 150 generates a local intermediate frequency. The locally generated intermediate frequency is divided into two paths: a direct one (in-phase channel) and one with a 90-degree phase shift (quadrature channel). In the Doppler removal module 140, the carrier frequency can be removed by multiplying $r_{IF}(n)$ with the two locally generated orthogonal carrier signals respectively, then, an in-phase component $I_{BB}(n)$ and a quadrature component $Q_{BB}(n)$ can be obtained:

$$\begin{cases} I_{BB}(n) = \sqrt{P} c(n-\tau_{IF}) d(n-\tau_{IF}) \cos(\Delta \omega n + \phi) + n_i(n) \\ Q_{BB}(n) = \sqrt{P} c(n-\tau_{IF}) d(n-\tau_{IF}) \sin(\Delta \omega n + \phi) + n_q(n) \end{cases} \quad (3)$$

where $\Delta \omega$ is a residual frequency shift, $\phi$ is an initial phase shift of the carrier frequency, $n_i(n)$ and $n_q(n)$ is in-phase white Gaussian noise and quadrature white Gaussian noise respectively, wherein the variance of the two white Gaussian noise are both $\sigma^2$, $n_i(n)$ and $n_q(n)$ are independent random variables. For simplicity, let us suppose $\Delta\omega=0$.

During the acquisition stage 170, correlations are performed on $I_{BB}(n)$ and $Q_{BB}(n)$ respectively in the integration module 160. The integration module 160 comprises L parallel correlators (e.g. 2046 correlators) to perform L integrations to conduct a full phase search of the C/A code, where L is a predetermined number. In one instance, the phase shift of each C/A code used by two adjacent correlators may be a time shift of half a chip. Since the C/A code includes 1023 chip codes, 2046 correlators may need to complete a full phase search of the C/A code. Therefore, L is 2046 in this case. The integration performed by each correlator is obtained by multiplying $I_{BB}(n)$ or $Q_{BB}(n)$ with a proper C/A code generated by a local PRN code NCO 180 over a time period (known as integration time). In one embodiment, the integration time may be set at 1 ms (period of C/A code). The output of correlator I includes two components: an in-phase correlation result $I_C(l)$ and a quadrature correlation result $Q_C(l)$, expressed as follow:

$$\begin{cases} I_C(l) = s_i(l) + \tilde{n}_i(l) \\ Q_C(l) = s_q(l) + \tilde{n}_q(l) \end{cases} \quad (4)$$

where $l=0,1,2 \ldots L-1$. In the equation (4), each correlation result includes two components: a desired signal and noise, wherein $s_i(l)$ and $s_q(l)$ are desired in-phase correlation results and desired quadrature correlation results, $\tilde{n}_i(l)$ and $\tilde{n}_q(l)$ are in-phase noise and quadrature noise of the correlation result.

$s_i(l)$ and $s_q(l)$ are expressed by the following equation:

$$\begin{cases} s_i(l) = \sum_{n=1}^{N} \sqrt{P} \, d(n-\tau_{IF}) c(n-\tau_{IF}) c_{local}(n-\tau_l) \cos(\phi) \\ s_q(l) = \sum_{n=1}^{N} \sqrt{P} \, d(n-\tau_{IF}) c(n-\tau_{IF}) c_{local}(n-\tau_l) \sin(\phi) \end{cases} \quad (5)$$

where N is the number of data points in a predetermined integration time, $c_{local}(n-\tau_l)$ is a locally generated C/A code corresponding to correlator I, $\tau_l$ is a time delay of the locally generated C/A code corresponding to correlator I.

$\tilde{n}_i(l)$ and $\tilde{n}_q(l)$ are expressed by following equation:

$$\begin{cases} \tilde{n}_i(l) = \sum_{n=1}^{N} n_i(n) c_{local}(n-\tau_l) \\ \tilde{n}_q(l) = \sum_{n=1}^{N} n_q(n) c_{local}(n-\tau_l) \end{cases} \quad (6)$$

When the locally generated C/A code substantially matches the C/A code contained in the received signal, or the phase shift of the locally generated C/A code is substantially the same as that of the C/A code contained in the received signal (it should be noted that because of the slight phase shift of the C/A code of the received signal, the locally generated C/A code might not 100% matches the C/A code of in the received signal), then the desired signal $s_i(l)$ and $s_q(l)$ can be written as:

$$\begin{cases} s_i(l) = N\sqrt{P}\cos(\phi) \\ s_q(l) = N\sqrt{P}\sin(\phi) \end{cases} \quad (7)$$

otherwise, the values of $s_i(l)$ and $s_q(l)$ can be very small, and some of the values might even be close to zero.

It is known by those skilled in the art that $\tilde{n}_i(l)$ and $\tilde{n}_q(l)$ are independent white Gaussian noise with zero mean and a variance of $N\sigma^2$. In order to eliminate the undesired effect produced by residual frequency shift and the initial phase shift of the carrier frequency, a sum-of-square module 190 is utilized. In the sum-of-square module 190, the in-phase and quadrature correlation results from each correlator are squared and a sum of the squared value is calculated. The sum-of-square value is denoted herein as $S_{acq}(l)$ expressed by the following equation:

$$S_{acq}(l) = I_C^2(l) + Q_C^2(l) \quad (8)$$

where $l=0,1,2 \ldots 2045$. Accordingly, 2046 sum-of-square values can be obtained in the present embodiment.

Suppose a locally generated C/A code corresponding to correlator $1_o$ substantially matches the C/A code of the received signal, then, the mean of output signal from the correlator $1_o$ equals the mean of the desired correlation signal because the mean of noise component is zero, and the variance of the output signal is $N\sigma^2$. when $l=l_o$, the distribution of $I_C(l_o)$ and $Q_C(l_o)$ are illustrated by the following expression:

$$I_C(l_o) \sim (N\sqrt{P}\cos(\phi), N\sigma^2), Q_C(l_o) \sim (N\sqrt{P}\sin(\phi), N\sigma^2) \quad (9)$$

The mean of $I_C^2(l_o)$ and $Q_C^2(l_o)$ can be obtained according to the mean of $I_C(l_o)$ and $Q_C(l_o)$ and the variance of $I_C(l_o)$ and $Q_C(l_o)$ shown in expression (9), as expressed by the following equation (10) and (11)

$$E[I_C^2(l_o)] = N^2 P \cos^2(\phi) + N\sigma^2 \quad (10)$$

$$E[Q_C^2(l_o)] = N^2 P \sin^2(\phi) + N\sigma^2 \quad (11)$$

The sum-of-square value of $I_C(l_o)$ and $Q_C(l_o)$ may be regarded as the signal power and can be obtained as:

$$E[S_{acq}(l_o)] = E[I_C^2(l_o) + Q_C^2(l_o)] = E[I_C^2(l_o)] + E[Q_C^2(l_o)]$$
$$= N^2 P + 2N\sigma \quad (12)$$

However, when $l \neq l_o$, which indicates that the locally generated C/A code is not time aligned with the C/A code of the received signal, the distribution of $I_C(l)$ and $Q_C(l)$ is expressed as follow:

$$I_C(l) \sim (0, N\sigma^2), Q_C(l) \sim (0, N\sigma^2) \quad (13)$$

where the mean of $I_C(l)$ and $Q_C(l)$ are both zero, the variance of $I_C(l)$ and $Q_C(l)$ are both $N\sigma^2$.

The mean of $I_2^C(l)$ and $Q_2^C(l)$ ($l \neq l_a$) can be obtained according to expression (14) and (15) are expressed by the following equation (11) and (12):

$$E[I_C^2(l)] = N\sigma^2 \quad (14)$$

$$E[Q_C^2(l)] = N\sigma^2 \quad (15)$$

Then, the average of noise power can be obtained:

$$E[S_{acq}(l)] = E[I_C^2(l) + Q_C^2(l)] = E[I_C^2(l)] + E[Q_C^2(l)]$$
$$= 2N\sigma^2 \quad (16)$$

Let $S_{ACQ} = S_{acq}(l_o)$, $S_{ACQ\_n} = E[S_{acq}(l)](l \neq l_o)$, according to the definition of SNR, the SNR value $SNR_{ACQ}$ after acquisition stage can be expressed as follow:

$$SNR_{ACQ} = \frac{S_{ACQ} - S_{ACQ\_n}}{S_{ACQ\_n}} = \frac{N^2 P + 2N\sigma^2 - 2N\sigma^2}{2N\sigma^2} = \frac{NP}{2\sigma^2} \quad (17)$$

In operation, after the sum-of-square module 190 calculates the sum-of-square value $S_{acq}(l)$ of the correlation results generated from the integration module 160, a peak value detect module 192 is used to search a peak value among the results from the sum-of-square module 190 ($S_{acq}(l_o), S_{acq}(l_1), \ldots, S_{acq}(l_o), \ldots, S_{acq}(l_{2045})$). It is apparent that the peak value is the signal power $S_{ACQ}$ (i.e. $S_{acq}(l_o)$). A mean value module 194 is adapted to calculating an average value among other 2045 sum-of-square values and obtain the average noise power value $S_{ACQ\_n}$. Then, an SNR estimation module 196 is used to calculate the SNR by subtracting the average noise power value from the signal power value to obtain a desired signal power value and calculating the signal-to-noise ratio by dividing the desired signal power value by the average noise power value. After the SNR is obtained, the parameter of the tracking loop including the bandwidth of the tracking loop and the integration time can be initialized based on the SNR value. The initializing step is completed by a tracking loop initialization module 198.

It should be noted that in order to ensure a high probability of a correct peak value is detected, the integration time should be extended so as to strengthen the correlation results. With strengthened correlation results, the peak value can be significantly greater than the noise signal and thereby non-peak value will not be easily regarded as a peak value. The SNR estimation derived from equation (17) is highly accurate when sufficient integration time is provided. Therefore, there is no need to further provide a complicated filtering process to filter the estimated SNR. In one embodiment, there is a plurality of sets of parameters preset in the tracking module. The tracking module is adapted to choose a proper set of parameters as the initial value for these parameters according to the SNR value estimated after the acquisition process.

Figure 2:
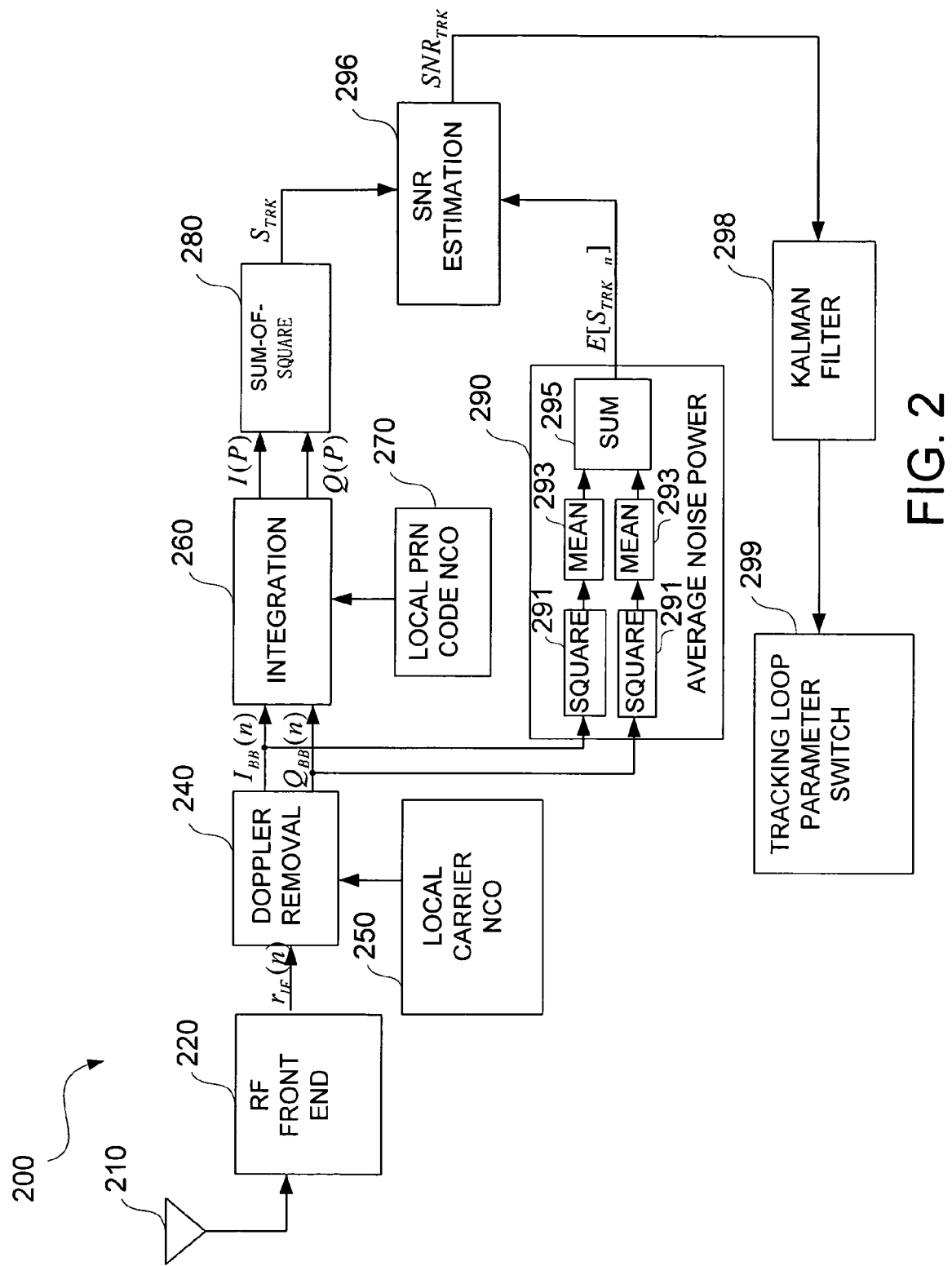
FIG. 2 illustrates a process for SNR estimation at the tracking stage.

FIG. 2 illustrates an exemplary SNR estimation method 200 for the tracking stage. The SNR estimation is conducted in the tracking stage. In one embodiment, the carrier loop might be a Costas loop and/or the code loop might be an early-late loop. As previously described, the method disclosed in FIG. 1 requires a full phase search of the C/A code and the integration time is relatively long. However, the carrier frequency and the C/A code may vary over time because of the Doppler effect, therefore, a real time tracking of the carrier frequency shift and the C/A code phase shift is required in tracking stage. Consequently, a long integration time and a complicated SNR calculation algorithm is no longer capable of accommodating the fast changing rate of the carrier frequency and C/A code shift as well as the variation of the signal strength of the received signal. As a result, the method disclosed in FIG. 1 is not suitable for SNR estimation during the tracking stage and might potentially degrade the performance of signal processing and increase the power dissipation of the related chips. Therefore, the invention can be further modified with a process shown in FIG. 2.

In FIG. 2, the functionality of antenna 210, RF front end module 220, Doppler removal module 240 and a local carrier NCO 250 is substantially identical to the ones described in FIG. 1. Therefore, for simplicity, the descriptions of these modules are omitted herein. Because, in the acquisition stage, there are also modules that perform substantially the same operation as the Doppler removal module 240 and the local carrier NCO 250, integration module 260, local PRN code NCO 270 in the tracking stage do. Therefore, it should be noted that the Doppler removal module 240, the local carrier NCO 250, the integration module 260, and the local PRN code NCO 270 might either be used independently in the tracking process, or share the same hardware implementation of the Doppler removal module, the local carrier NCO, the integration module, the local PRN code NCO included in the acquisition stage. In one embodiment, the Doppler removal module 240, the local carrier NCO 250, the local PRN code NCO 270 share the same hardware implementation of Doppler removal module 140, the local carrier NCO 150, and local PRN code NCO 180 in acquisition module 170, but the integration module 260 and the integration module 160 are designed separately.

After the Doppler shift is removed, the output (including an in-phase component $I_{BB}(n)$ and a quadrature component $Q_{BB}(n)$) from the Doppler removal module 240 has the same form as expressed in equation (3). As previously described in the background of the invention, a local PRN code NCO 270 comprised in the code loop is configured to generate three outputs: early code, late code and prompt code. When the tracking loop is stable, the prompt code can be regarded as time-aligned with the C/A code of the received signal. In the integration module 260, the received IF signal is correlated with early code, late code and prompt code respectively over a time period. The correlation results of the prompt signal can be obtained as:

$$\begin{cases} I(P) = s_i(P) + \tilde{n}_i(P) \\ Q(P) = s_q(P) + \tilde{n}_q(P) \end{cases} \quad (19)$$

where $s_i(P)$ and $s_q(P)$ are a desired in-phase correlation result and a desired quadrature correlation result respectively. The expression of $s_i(P)$ and $s_q(P)$ are substantially the same as the one expressed in the equation (7). The distribution of I(P) and Q(P) is the same as $I_C(l_o)$ and $Q_C(l_o)$: $I_C(P) \sim (N\sqrt{P}\cos(\phi), N\sigma^2)$, $Q_C(P) \sim (N\sqrt{P}\sin(\phi), N\sigma^2)$. $\tilde{n}_i(P)$ and $\tilde{n}_q(P)$ are in-phase noise component and quadrature noise component of the correlation result.

A sum-of-square module 280 is employed to calculate the signal power $S_{TRK}$. The signal power value $S_{TRK}$ is obtained by squaring the mean of in-phase correlation result I(P) and the mean of quadrature correlation result Q(P), and adding each squared mean value of I(P) and Q(P):

$$\begin{aligned} S_{TRK} &= E[S_{trk}] = E[I^2(P) + Q^2(P)] = E[I^2(P)] + E[Q^2(P)] \\ &= N^2 P + 2N\sigma^2 \end{aligned} \quad (20)$$

wherein the calculation of the signal power value $S_{TRK}$ may refer to the calculation of $S_{ACQ}$.

For the received GPS signal, the signal is very weak before integration. According to the specification for the minimum voltage level of a GPS signal, the noise power may be 100 times greater than the GPS signal power even in an outdoor environment. Therefore, for $I_{BB}(n)$ and $Q_{BB}(n)$, the noise components play a dominant role and thus $I_{BB}(n)$ and $Q_{BB}(n)$ might be regarded as white Gaussian noise sequence with a zero mean. Therefore, the noise power can be obtained:

$$S_{trk\_n} = I_{BB}^2(n) + Q_{BB}^2(n) \quad (21)$$

Since the mean of $I_{BB}(n)$ and $Q_{BB}(n)$ are both zero, and their variance are both $\sigma^2$, the mean of $I_{BB}^2(n)$ and $Q_{BB}^2(n)$ may be expressed as follow:

$$E[I_{BB}^2(n)] = \sigma^2 \quad (22)$$

$$E[Q_{BB}^2(n)] = \sigma^2 \quad (23)$$

Consequently, the average noise power $S_{TRK\_n}$ at a data point is obtained as:

$$S_{TRK\_n} = E[S_{trk\_n}] = E[I_{BB}^2(n) + Q_{BB}^2(n)] = E[I_{BB}^2(n)] + E[Q_{BB}^2(n)] = 2\sigma^2 \quad (24)$$

Since there are N data points in a predetermined integration time period, the average noise power over the whole integration time might be expressed as $N*S_{TRK\_n}$. According to the definition of SNR, the SNR estimated during tracking stage $SNR_{TRK}$ can be expressed as follow:

$$SNR_{TRK} = \frac{S_{TRK} - N*S_{TRK\_n}}{N*S_{TRK\_n}} \quad (25)$$

In operation, an average noise power module 290 is utilized to calculate $S_{TRK\_n}$. The module includes a square module 291, a mean module 293, and a sum module 295. The square module 291 squares $I_{BB}(n)$ and $Q_{BB}(n)$. The mean module 293 calculates the mean of the squared value of $I_{BB}(n)$ and $Q_{BB}(n)$. The sum module 295 sums the mean of the squared value of $I_{BB}(n)$ and the mean of the squared value of $Q_{BB}(n)$. An SNR estimation module 296 is used to calculating SNR according to the expression (25).

The merits of the above described method are apparent. The calculation of the average noise power is simplified and is based on $I_{BB}(n)$ and $Q_{BB}(n)$ on which the integration has not been performed. Therefore, the bit number resulting from the quantification of the average noise power is reduced. It is easily understood that with the reduced quantification bit number, the hardware complexity and the power dissipation of the related chips might be greatly reduced, and, consequently, the goal of real-time SNR estimation can be achieved. Furthermore, the calculation of the signal power takes the advantage of the reuse of prompt code generated by the early-late code loop, which might also contribute to a reduced hard complexity.

Due to the restraint on the integration time in the tracking stage, the integration time should not be very long in this method. Additionally, because of the simplification made during the calculation of the average noise power, the SNR estimation in tracking stage might not be as accurate as the SNR estimation disclosed in FIG. 1. Therefore, a filter might be necessary to filter and smooth the estimated SNR. In the present embodiment, a first order Kalman filter 298 is provided to filter the output from SNR estimation module 296. The choice of the Kalman filter is a tradeoff between the complexity of hardware implementation and the filtering performance. The implementation of the first order Kalman filter is readily appreciated by those skilled in the art. It should be noted that filters other than the Kalman filter may also be used. For example, other type of filters such as a low pass filter or an average filter might also be used in the method described herein. However, Kalman filter presents a better performance in this embodiment compared with the low pass filter and the average filter do.

In a tracking loop parameter switch module 299, the tracking loop parameters such as the bandwidth of the tracking loop and the integration time might be finely tuned according to the SNR estimated in tracking stage in real time. For a high SNR, the bandwidth is tuned to be wider and the integration time is set to be shorter. For a low SNR, the bandwidth is tuned to be narrow and the integration is set to be longer. In one embodiment, there is a plurality of sets of parameters preset in the tracking module. The tracking module is adapted to switch to a proper set of parameters according to the real-time SNR estimation value during tracking stage.

It should be readily appreciated by those skilled in the art that the SNR estimation method during tracking stage might also be applicable to the SNR estimation used after acquisition stage and before the tracking stage.

The terms and expressions which have been employed herein are used as terms of description and not of limitation, and there is no intention, in the use of such terms and expressions, of excluding any equivalents of the features shown and described (or portions thereof, and it is recognized that various modifications are possible within the scope of the claims. Other modifications, variations, and alternatives are also possible. Accordingly, the claims are intended to cover all such equivalents.

What is claimed is:

1. A method for estimating a signal-to-noise ratio of a spread spectrum signal, the spread spectrum signal being digitized at a predetermined frequency, the method comprising:

receiving the spread spectrum signal in a receiver, the spread spectrum signal having an in-phase component and a quadrature component;

receiving a predetermined pseudorandom code from a code generator;

determining an in-phase correlation result based on the in-phase component and a predetermined pseudorandom code over a time period;

determining a quadrature correlation result based on the quadrature component and the predetermined pseudorandom code over the time period;

determining a signal power value based on the in-phase correlation result and the quadrature correlation result;

determining an average noise power value based on the in-phase component and the quadrature component, wherein the in-phase component being a digital signal having a plurality of data points within the time period, the quadrature component being a digital signal having a plurality of data points within the time period, the average noise power value being determined by squaring each data point of the in-phase component;

calculating a first mean among the squared data points of in-phase component;

squaring each data point of the quadradure component;

calculating a second mean among the squared data points of quadrature component; and summing the first mean and the second mean to obtain the average noise power value; and determining in a SNR estimation module the signal-to-noise ratio based at least on the signal power value and the average noise power value.

2. The method of claim 1, wherein the step of determining the signal power value comprising:

squaring the in-phase correlation result and the quadrature correlation result; and summing the squared value of in-phase correlation result and the squared value of quadrature correlation result to obtain a signal power value.

3. The method of claim 1, wherein the step of determining the signal-to-noise ratio further comprising:

multiplying the average noise power value and a number of data points within the time period to obtain a total average noise power value over the time period;

subtracting the total average noise power value from the signal power value to obtain a desired signal power value; and dividing the desired signal power value by the total average noise power value to obtain the signal-to-noise ratio.

4. The method of claim 1, wherein the predetermined pseudorandom code having substantially the same phase shift with a pseudorandom code spreading the spread spectrum signal.

5. The method of claim 1, wherein the predetermined pseudorandom code being a prompt pseudorandom code generated by a code generator in a code tracking loop during tracking stage in spread spectrum signal processing.

6. The method of claim 1, further comprising filtering the signal-to-noise ratio to obtain a smooth signal-to-noise ratio.

7. The method of claim 6, wherein the filtering further comprising providing a Kalman filter to perform the filtering.

* * * * *